United States Patent
Hall

Patent Number: 5,463,652
Date of Patent: Oct. 31, 1995

[54] COMBINING OPTICS FOR RING LASER GYRO

[75] Inventor: David B. Hall, La Crescenta, Calif.

[73] Assignee: Litton Systems, Inc., Woodland Hills, Calif.

[21] Appl. No.: 103,842

[22] Filed: Oct. 1, 1987

[51] Int. Cl.$^6$ .................. G01C 19/64; H01S 3/04
[52] U.S. Cl. .................. 372/94; 356/350
[58] Field of Search .................. 356/350, 351; 372/94

[56] References Cited

U.S. PATENT DOCUMENTS

| | | | |
|---|---|---|---|
| 3,976,379 | 8/1976 | Morokuma | 356/351 |
| 4,025,194 | 5/1977 | Teppe | 356/5 |
| 4,084,883 | 4/1978 | Eastman et al. | 350/152 |
| 4,276,518 | 6/1981 | Ferguson | 331/94.5 |
| 4,289,381 | 9/1981 | Garvin et al. | 350/320 |
| 4,408,334 | 10/1983 | Lundstrom | 372/98 |
| 4,449,824 | 5/1984 | Matthews | 356/350 |
| 4,461,009 | 7/1984 | Lundstrom | 372/108 |
| 4,473,297 | 9/1984 | Simpson et al. | 356/350 |
| 4,514,087 | 4/1985 | Vescial | 356/350 |
| 4,514,479 | 4/1985 | Ferrante | 430/2 |
| 4,514,832 | 4/1985 | Vescial | 356/350 |
| 4,526,469 | 7/1985 | Egli et al. | 356/350 |
| 4,536,063 | 8/1985 | Southwell | 350/395 |
| 4,571,082 | 2/1986 | Downs | 356/351 |
| 4,582,429 | 4/1986 | Callaghan | 356/350 |
| 4,588,296 | 5/1986 | Cahill | 350/96.5 |
| 4,632,555 | 12/1986 | Malvern | 356/350 |
| 4,643,575 | 2/1987 | Hazeltine et al. | 356/351 |
| 4,676,643 | 6/1987 | Vescial | 356/350 |
| 4,717,250 | 1/1988 | Sonmayrer | 356/351 |

*Primary Examiner*—Nelson Moskowitz
*Attorney, Agent, or Firm*—L. David Rish; James F. Kirk; Chester E. Martino, Jr.

[57] ABSTRACT

The apparatus of this invention uses a rectangular-parallelepiped prism to extract portions of the counterpropagating beams from a ring laser of a gyro. Such prism is easier to build than prisms having other than right angles. One beam bounces within the prism, but it is not perfectly reflected, and a portion of the beam is transmitted to a sensor to control the length of the ring laser cavity. The two beams are combined to produce a heterodyne signal by using two partly transmissive mirrors on two parallel surfaces of the prism, and by positioning a third side surface at a critical angle relative to one of the beams.

5 Claims, 3 Drawing Sheets

COMBINING OPTICS FOR RING LASER GYRO

BACKGROUND OF THE INVENTION

Ring laser gyros use a ring laser, usually imbedded in a dimensionally stable laser block having a low thermal expansion coefficient. The laser block typically has three or more substantially coplanar bores therein, each containing a laser gas such as helium and neon. At the junctions of the bores are corner mirrors that are spaced to define the laser cavity. Typically a cold cathode and a pair of anodes with a d.c. voltage between the cathode and the nodes are used to produce the lasing. The ring laser has two counterpropagating laser beams therein. As the laser is rotated about an axis, enclosed by the ring laser, the two beams separate in frequency. That difference in frequency is a measure of the angular velocity of the ring laser. For the ring laser to be used as a gyro, it is necessary to extract a portion of each of the two beams and to beat them against each other to obtain a heterodyne. The optical interference between the two beams produces fringes, and the fringes move with the angular velocity to be measured. A fringe counter may be used to determine the angular velocity or angle of displacement of the ring laser, and a ring laser gyro is thereby produced.

To extract a portion of the light of each beam, (on the order of 0.01%), one of the corner mirrors is partly transmissive. The transmitted light is then guided so that interference fringes may be produced. The prior art optics for extracting portions of the beams used a prism with total reflection of one of the two beams with two bounces for each beam before it strikes a beam splitter. The beam-splitter directs the light from both beams into a common optical sensor where the fringes per unit of time are counted. Frequently a second corner mirror is partly transmissive to extract a part of one or more of the beams. The light so-extracted can be used to control the inward and outward movement of a third corner mirror to control the cavity length of the ring laser.

BRIEF DESCRIPTION OF THE INVENTION

The apparatus of this invention uses a rectangular-parallelepiped prism which is easier to build than prisms having other than right angles. One beam bounces within the prism, but it is not perfectly reflected, and a portion of the beam is transmitted to control the length of the ring laser cavity. The two beams are combined by using two partly transmissive mirrors on two parallel surfaces of the prism, and by positioning a third side surface at a critical location relative to one of the beams.

It is therefore an object of this invention to extract a portion of the light from the laser beams of a ring laser.

It is another object of the invention to provide output optics for a ring laser gyro.

Other objects will become apparent from the following description, taken together with the accompanying drawings.

DETAILED DESCRIPTION OF THE INVENTION

Figure 1:
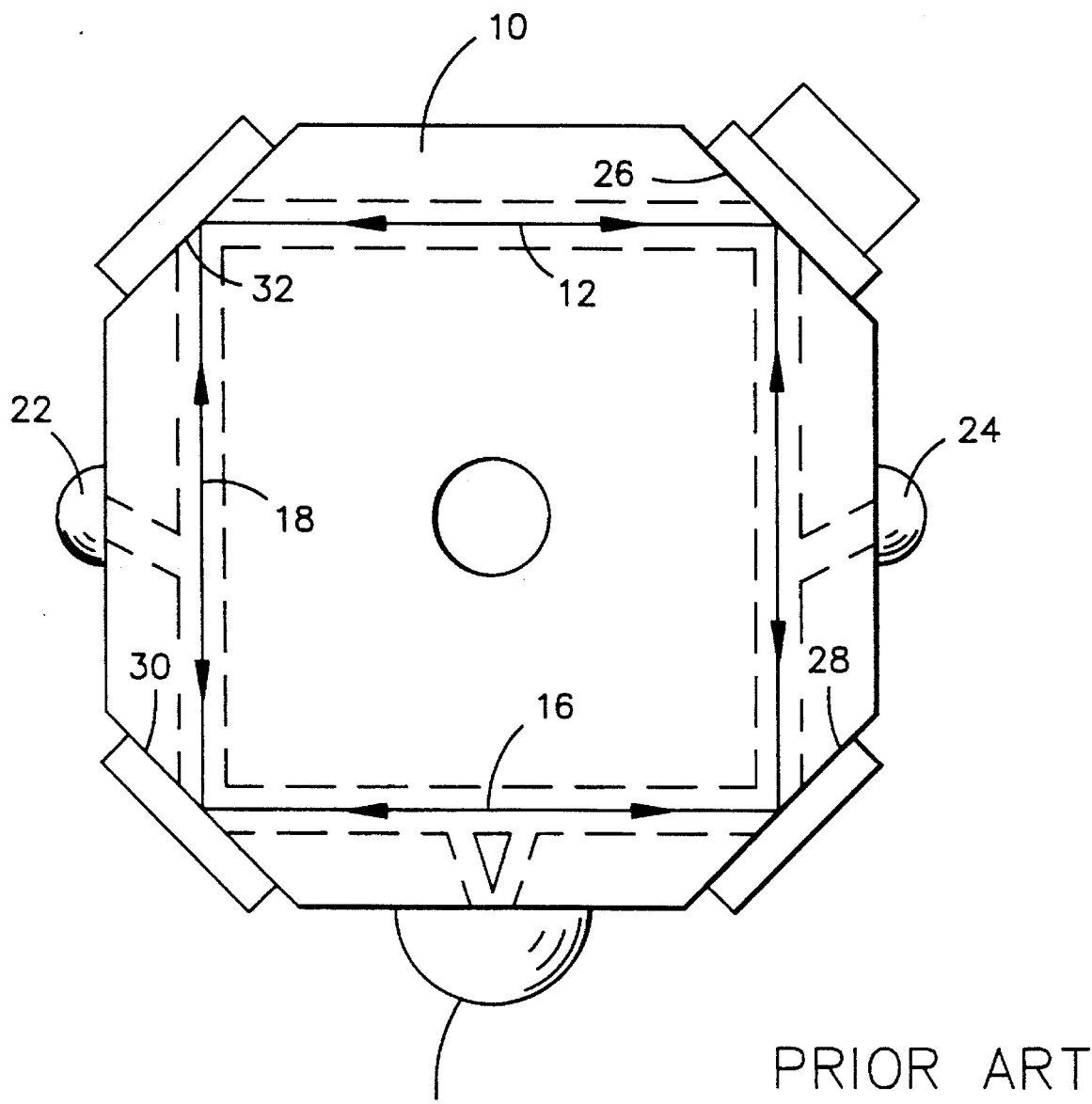
FIG. 1 is a plan view of a typical prior art four-mirror ring laser for use in a ring laser gyro.

In the prior art ring laser of FIG. 1, a block 10 has four bores 12, 14, 16, 18 therein for containing a laser gas and for supporting a ring laser. A cathode 20 and two anodes 22, 24 are positioned and in communication with the laser gas so that when a voltage is placed between the cathode 20 and the two anodes 22, 24, two counterpropagating laser beams are created in the ring laser. Four mirrors 26, 28, 30, 32 are positioned at the intersection of the laser bores, and the mirror coating is typically tuned to reflect only a narrow band of light frequencies near the laser frequency.

Figure 2:
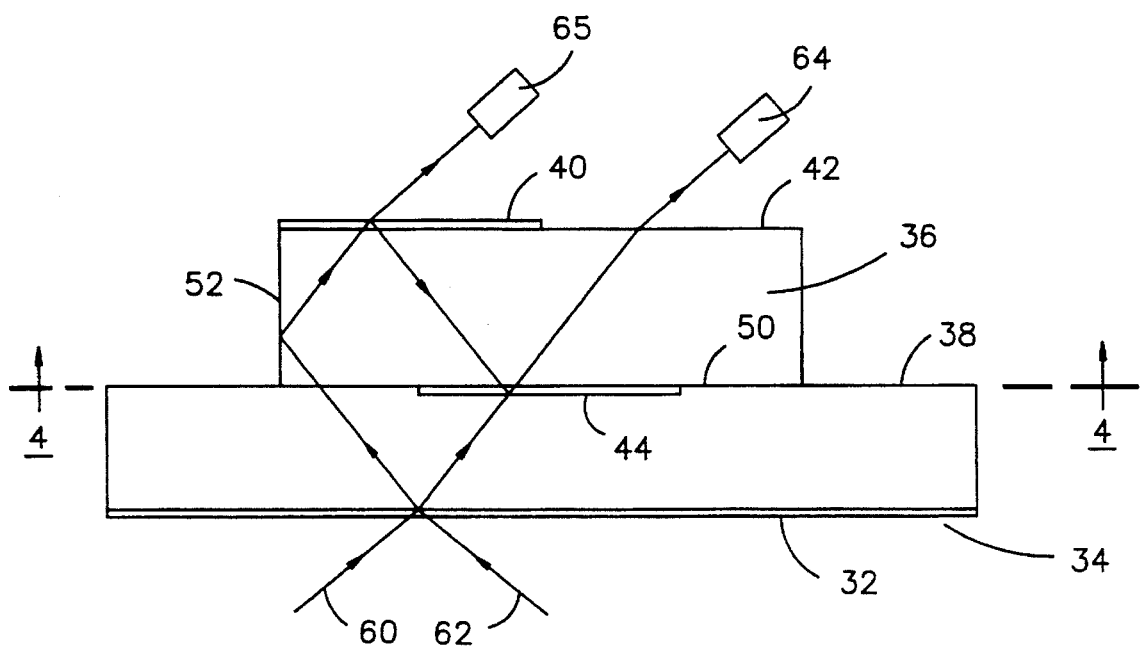
FIG. 2 is a ray diagram showing the beam flow through the apparatus of the invention.

As shown in FIG. 2, the mirror 32 is a dielectric film positioned on the substrate 34. A rectangular-parallelepiped prism 36 is positioned upon the outer surface 38 of the substrate 34. The parallelepiped prism 36 is attached, as by gluing, to the mirror substrate 34. One thin-film mirror 40 is positioned on and attached to the outer surface 42 of the prism 36. A second mirror surface 44 is attached, either to the substrate, the prism, or both, between the substrate 34 and the prism 36.

Typically, the first mirror 40 conducts about 20% of its incident light and reflects the rest. The second mirror surface 44 conducts about 45% of its incident light and reflects the rest. For description purposes, consider the prism surface 50, contacting the substrate 34, to be the "bottom" surface.

The side surface 52, and the surfaces 42 and 50 of the prism 36 are optically flat surfaces.

Figure 3:
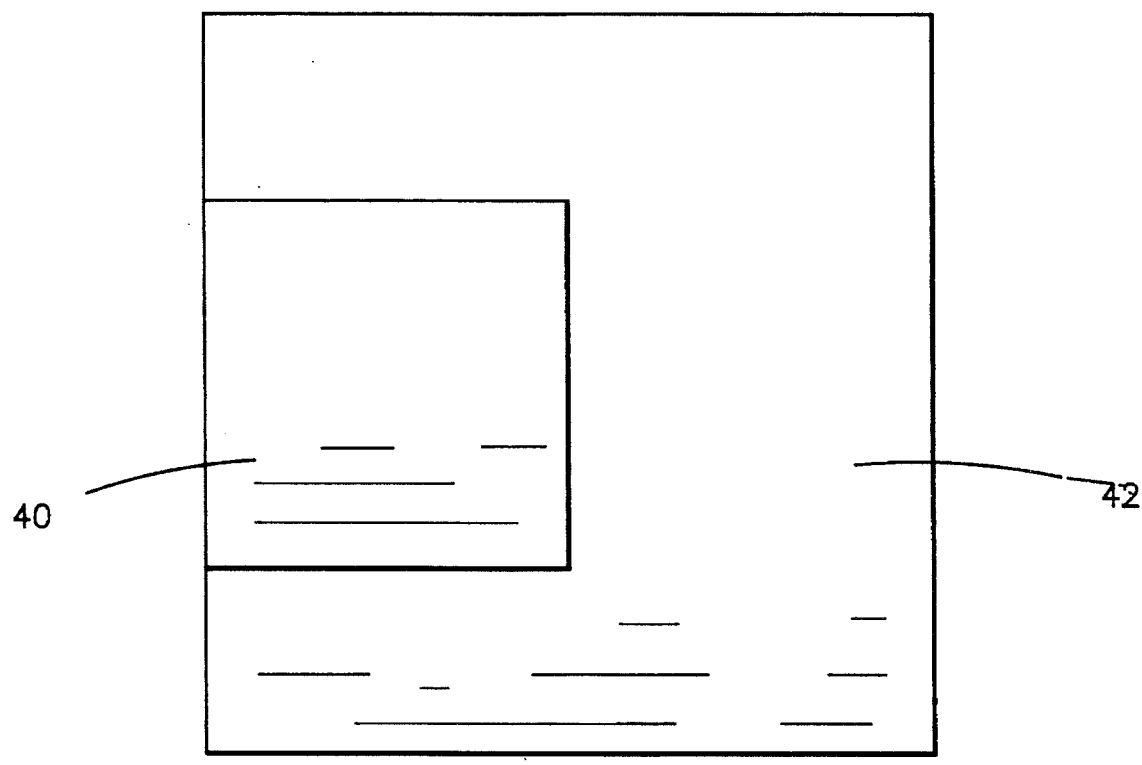
FIG. 3 is a top view of the apparatus of FIG. 2.
Figure 4:
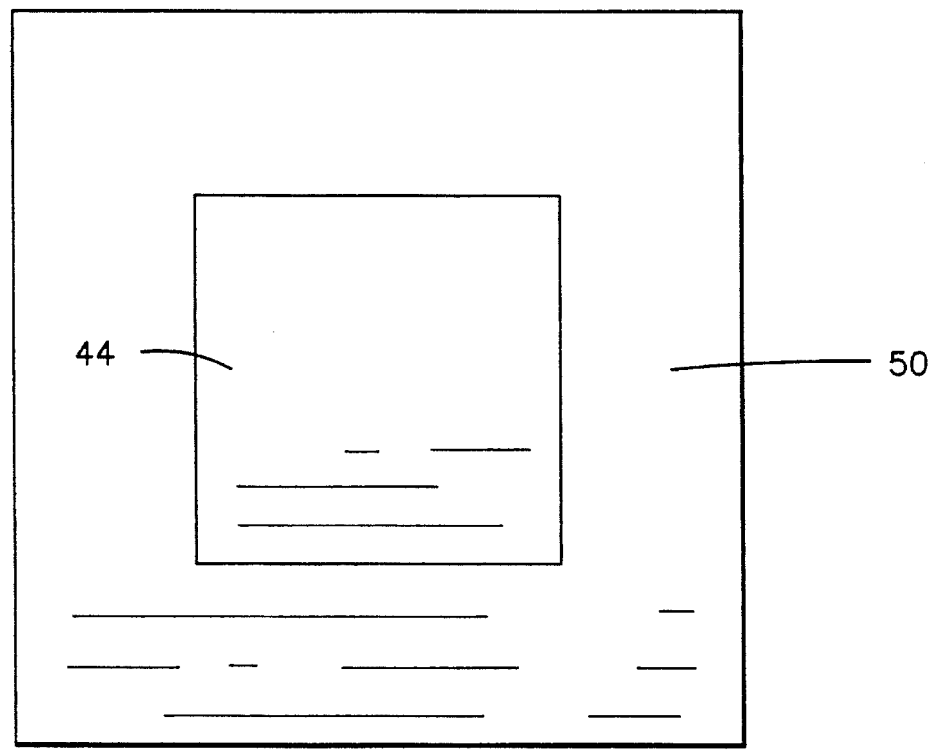
FIG. 4 is a view taken at 4—4 in FIG. 2.

The top and bottom surfaces 42 and 50 are shown, in FIGS. 3 and 4, to be square surfaces. Typical dimensions of the three precision surfaces are:

| surface | dimensions |
| --- | --- |
| 42 | 0.400" × 0.400" |
| 50 | 0.400" × 0.400" |
| 52 | 0.400" × 0.225" |
| 40 | 0.200" × 0.200" |
| 44 | 0.200" × 0.200" |

As shown in FIG. 3, the mirror 40 is centered in the dimension normal to the plane of FIG. 2, and it extends substantially from the edge of the surfaces 52 and 42 about one-half of the length of the surface 42. Note, however, that this dimension is not critical, for it is only necessary that the mirror 40 intercept the reflected beam 62.

As shown in FIG. 4, the mirror 44 is centered in the dimension normal to the plane of FIG. 2, and it extends from about one quarter of the length of the surface 50 for a distance about one-half of the length of the surface 50. Note, however, that this dimension is not critical, for it is only necessary that the mirror 44 intercept the reflected beam 62 and further reflect it substantially collinearly with the beam 60 into the light sensor 64.

The counterpropagating beams 60, 62, within the bores 12 and 14 of the ring laser of FIG. 1, penetrate the dielectric coating 32, and the mirror substrate 34. The precision wall 52 is positioned relative to the beam 62 such that the angle of incidence of the beam on the wall 52 exceeds the critical angle, and it is totally reflected toward the partly transmissive mirror 40. The mirror 40 reflects the beam 62 toward the partly-transmissive mirror 40. The portion of the beam conducted by the mirror 40 encounters the light sensor 65 to generate a signal that is a measure of the intensity of the light to be connected by a servo (not shown) to control the position of one of the mirrors 28, 30 or 32. The portion of the beam 62 reflected from mirror 40 encounters the mirror 44 which reflects from 40% to 60% of the beam's energy.

The beam 60 penetrating the mirrors 32 and 44, mixes with the beam 62 to produce fringes at the light sensor 64.

Thus the invention is an optical system for extracting a portion of two counterpropagating beams 60, 62 from a ring laser which includes laser corner mirrors 26, 28, 30, 32 each having a substrate 34, and to beat the beams together.

It uses a prism having at least first and second parallel optically flat surfaces 42, 50 and a third optically flat surface 52 perpendicular to the first and second surfaces 42, 50.

The prism has first and second partly transmissive mirrors 40, 44, respectively, on the first and second flat surfaces 42, 50.

The prism is attached to the substrate of one of the laser corner mirrors 32 with the first and second optically flat surfaces 42, 50 substantially parallel to the corner mirror 32.

The third optically flat surface 52 is positioned to intercept light, at an angle of total reflection, transmitted through the one corner mirror 32 from a first beam 62 of the ring laser.

The first mirror 40 is positioned and configured on the first flat surface 42 to intercept the beam 62 reflected from the third surface 52, and both to transmit and reflect portions of the intercepted beam 62.

The second mirror 44 is positioned and configured on the second flat surface to intercept the portion of the beam 62 reflected from the first mirror 40 and to intercept and transmit a portion of the second beam 60 of the ring laser which is transmitted through the corner mirror 32, substantially collinearly with its reflected beam 62.

A light sensor is positioned to receive the two substantially collinear beams from the second mirror 44.

In a preferred embodiment, the prism 36 is a rectangular-parallelepiped prism.

In one embodiment, there is a second light sensor 65 that is positioned to intercept the light transmitted by the first mirror 40.

Preferably, the first mirror is a substantially 20% transmission and substantially 80% reflection mirror, and the second mirror is a substantially 40% to 60% reflection and substantially 60% to 40% transmission mirror.

Thus, the optical configuration of this invention is a system for extracting a portion of two counterpropagating beams from a ring laser in an economical manner. The optical system is easier to manufacture than those hitherto conceived.

It is not intended that this invention shall be limited by the above description, but only by such description taken together with the accompanying claims.

I claim:

1. An optical system for extracting a portion of two counterpropagating beams from a ring laser which includes laser corner mirrors each having a substrate, and to beat said beams together, comprising:

a prism having first outer and second inner parallel optically flat surfaces and a third optically flat surface perpendicular to said first and second surfaces;

said prism having a first partly transmissive mirror, on said first surface;

said prism being attached to the said substrate of one of said laser corner mirrors with said first and second optically flat surfaces substantially parallel to said one corner mirror;

said third optically flat surface being positioned to intercept and reflect light transmitted through said one corner mirror from a first one of the two counterpropagating beams of said ring laser;

said first mirror being positioned and configured on said first flat surface to intercept said beam reflected from said third surface and both to transmit and reflect portions of said intercepted beam;

a second mirror, positioned and configured at the interface between said substrate and said second flat surface on said prism to intercept the reflected portion of said beam reflected from said first mirror and to intercept and transmit a portion of the second one of the two counterpropagating beams of said ring laser, transmitted through said one corner mirror, substantially collinearly with its said reflected beam; and a light sensor positioned to receive said two substantially collinear beams from said second mirror.

2. Apparatus as recited in claim 1 wherein said prism is a rectangular-parallelepiped prism.

3. Apparatus as recited in claim 1 and further comprising a second light sensor, positioned to intercept the light transmitted by said first mirror.

4. Apparatus as recited in claim 3 wherein said first mirror is a substantially 20% transmission and substantially 80% reflection mirror; and said second mirror is a substantially 40% to 60% reflection and substantially 60% to 40% transmission mirror.

5. Apparatus as recited in claim 1 wherein said second mirror is a substantially 40% to 60% reflection and substantially 60% to 40% transmission mirror.

\* \* \* \* \*